(12) United States Patent
Shih

(10) Patent No.: US 6,333,851 B1
(45) Date of Patent: Dec. 25, 2001

(54) HEAT DISSIPATING POWER SUPPLY

(76) Inventor: Shoei-Yuan Shih, No 8, Lane 85, Hsing-I Rd., Pei-Tou Dist., Taipei (TW)

( * ) Notice: Subject to any disclaimer, the term of this patent is extended or adjusted under 35 U.S.C. 154(b) by 0 days.

(21) Appl. No.: 09/577,574

(22) Filed: May 25, 2000

(51) Int. Cl.$^7$ .................................................. H05K 7/20
(52) U.S. Cl. ........................ 361/695; 361/690; 361/694; 174/16.1; 165/104.33; 454/184
(58) Field of Search .................... 361/677, 678, 361/689, 690, 694, 695; 174/15.1, 16.1, 16.3; 165/80.2, 80.3, 104.33, 104.34, 122; 312/223.1, 223.2; 454/184

(56) References Cited

U.S. PATENT DOCUMENTS

| | | | |
|---|---|---|---|
| 4,702,154 | * 10/1987 | Dodson | 165/122 |
| 5,121,291 | * 6/1992 | Cope et al. | 361/695 |
| 5,440,450 | * 8/1995 | Lau et al. | 361/695 |
| 5,523,917 | * 6/1996 | Searby | 361/687 |
| 5,559,673 | * 9/1996 | Gagnon et al. | 361/695 |
| 5,793,608 | * 8/1998 | Winick et al. | 361/695 |
| 6,058,011 | * 5/2000 | Hardt et al. | 361/694 |

* cited by examiner

Primary Examiner—Leo P. Picard
Assistant Examiner—Boris L. Chervinsky
(74) Attorney, Agent, or Firm—Bacon & Thomas, PLLC

(57) ABSTRACT

A power supply is installed in an industrial computer. The power supply has a housing. The housing is installed with a first fan set for dissipating heat from the components in the power supply. A spacer is installed in the housing for spacing the fan set. An air channel is in communication with the computer and is defined by the spacer, and a second fan set is installed in the air channel for dissipating heat from the computer.

5 Claims, 5 Drawing Sheets

HEAT DISSIPATING POWER SUPPLY

BACKGROUND OF THE INVENTION

1. Field of the Invention

The present invention relates to a power supply, and especially to a power supply in which a first and a second fan sets are disposed by a spacer. The fan sets serves to extract heat generated from the components in the power supply and heat from the computer chassis or housing, respectively. Thus, the effects of exhausting heat from a computer chassis and maintaining efficiency are achieved.

2. Description of the Related Art

In current trends of Internet and electronic business, network stations must serve a great number of customers which are increased day by day at a very rapid speed. However, the space in the computer chassis is limited. Thus, there is a need to minimize the volumes of computer mainframes and other equipment. In the practical application, a nineteen inches long industrial standard machine cabinet serves to arrange the computer housings and network equipment for saving space. Thus, the prior computer housing with specification designation of 5U (1.75 inches×5) and 4U (1.75 inches×4) will be changed by that of 2U (1.75 inches×2), even 1U (1.75 inches×1). Thus, the same space has a capacity of five times. This is an optimum method for network service providers to meet with the requirement of customers with a large number.

In current trend, the electronic products are minimized for meeting the requirement of compactness, but for products with large heat dissipation, the reduction of space will induce a problem of heat exhaustion to cause heat energy to be accumulated therein and the temperatures of the components will increase. Therefore, it is very possible that the efficiency is decreased, and even more seriously, the computer will malfunction due to the very high temperature. Therefore, there is an eager demand for a novel power supply which may increase the heat dissipation in electronic products with small volumes.

However, the size of nineteen inches industrial standard machine cabinet is a fixed size, for example, and the cabinet can not be modified, whereas the existing mother boards, interface cards, compact disk drives, hard disk drives, floppy disk drives, even power supplies have common standard specifications. Therefore, fans used in general computer housings have no proper places for being positioned. Moreover, the operation speeds of computers are getting faster, and thus the capacities of the memories and hard disk drive becomes larger and larger. With greater power requirements, more heat energy is generated. Thus, a key problem for a novel 19 inches 1U computer housing is to effectively reduce the temperature therein.

Alternatively, power supplies have a role to supply power to all electronic products, which is a very important function of computers. Thus, computers are provided with a space for receiving a power supply. A power supply serves to supply power. On the other hand, it also consumes power and increases temperature, but general power supplies are designed to dissipate power thereof in order not to affect other components, but not to reduce heat generated from other components in the system.

Therefore, in order to resolve these prior art problems in the computer 1U mainframe or housing and other compact electronic products, it is necessary to develop a novel heat dissipating power supply for achieving the object of adequately dissipating heat of the system..

SUMMARY OF THE INVENTION

Accordingly, the primary object of the present invention is to provide a power supply which is an improvement over the prior art. In the present invention, at a space for receiving a power supply in the nineteen inch 1U industrial standard computer housing, a first and a second fan sets are disposed by a spacer. The first fan set serves to extract heat generated from the components in the power supply, while the second fan set serves to extract heat from the computer housing through an air channel which is in communication with the computer housing and then exhausts the heat outwards. Thus, the problem of providing space for receiving fans so that temperature is reduced is resolved completely. The objects of exhausting heat from a computer housing and maintaining efficiency are achieved.

Another object of the present invention is to provide a power supply as recited above, wherein a spacer is integrally formed with the housing so that the housing is formed with a recess, and the second fan set is directly positioned in the computer chassis with respect to the recess of the housing by positioning means.

The various objects and advantages of the present invention will be more readily understood from the following detailed description when reading in conjunction with the appended drawing.

DETAILED DESCRIPTION OF THE PREFERRED EMBODIMENTS

Figure 1:
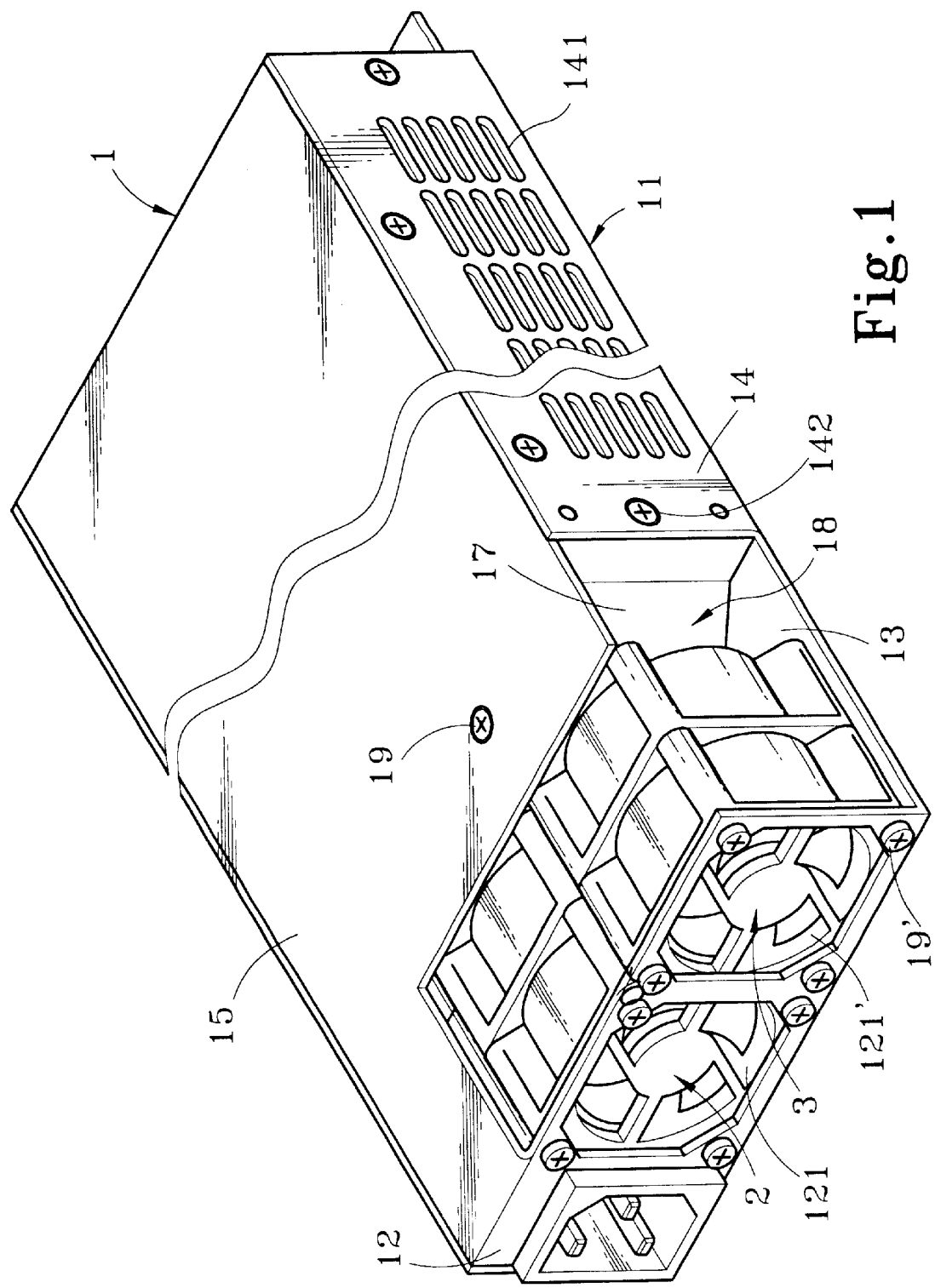
FIG. 1 is a schematic perspective view of the present invention.
Figure 2:
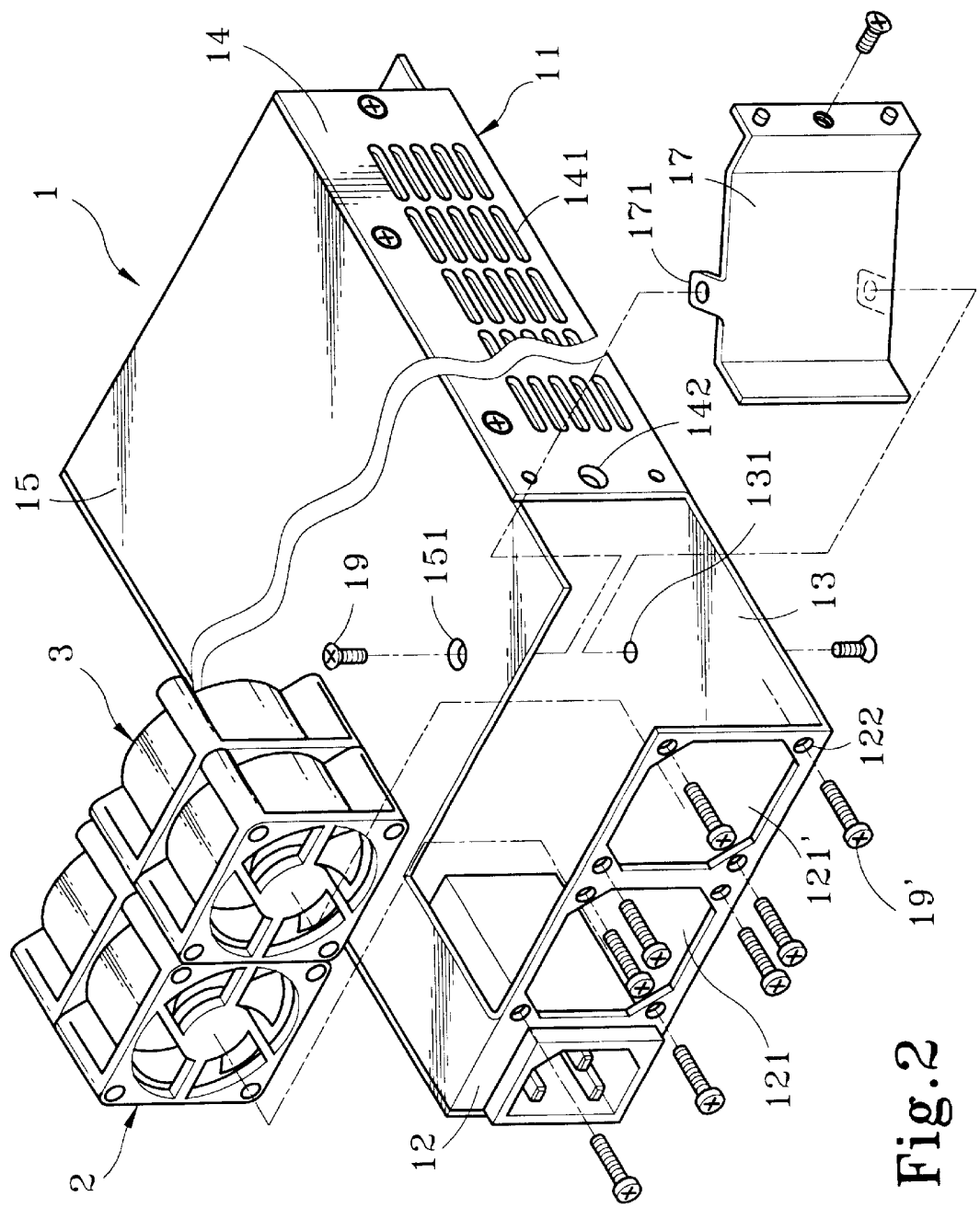
FIG. 2 is an exploded schematic view about the structure of the present invention.

With reference to FIGS. 1 and 2, the perspective view and the exploded schematic view of the present invention are illustrated. As shown in the figures, the power supply of the present invention is installed within a standard nineteen inches 1U industrial computer 4. The power supply 1 has a housing 11. The housing 11 is installed with a first fan set 2 for dissipating heat from the components in the power supply 1. A plurality of heat dissipating holes 141 are installed spaced on the lateral plate 14 of the housing 11. A spacer or guide 17 is further installed in the housing 11 for spacing the fan set 2 and directing air flow from the main computer chassis or housing 4 which the power supply housing H is attached. The periphery of the spacer or guide 17 is bent with a positioning portion 171 which can be inserted into and fixed in the assembled holes 142, 151, and 131 preset on the lateral plate 14, cover plate 15 and bottom plate 13 of the housing 11 through a positioning piece 19. The spacer or guide 17 defines an air channel 18 in communication with the computer chassis 4. A second fan set 3 is installed in the air channel 18 for dissipating heat from the computer chassis 4. Air holes 121 and 121', 143 and 143' and fixing hole 122 with respect to the air outlet and for positioning the first and second fan sets 2 and 3 are installed on the panel 12 or lateral plate 14. Therefore, a power supply 1 with the function of supplying power and for reducing heat in the computer chassis 4 is constructed.

Figure 3:
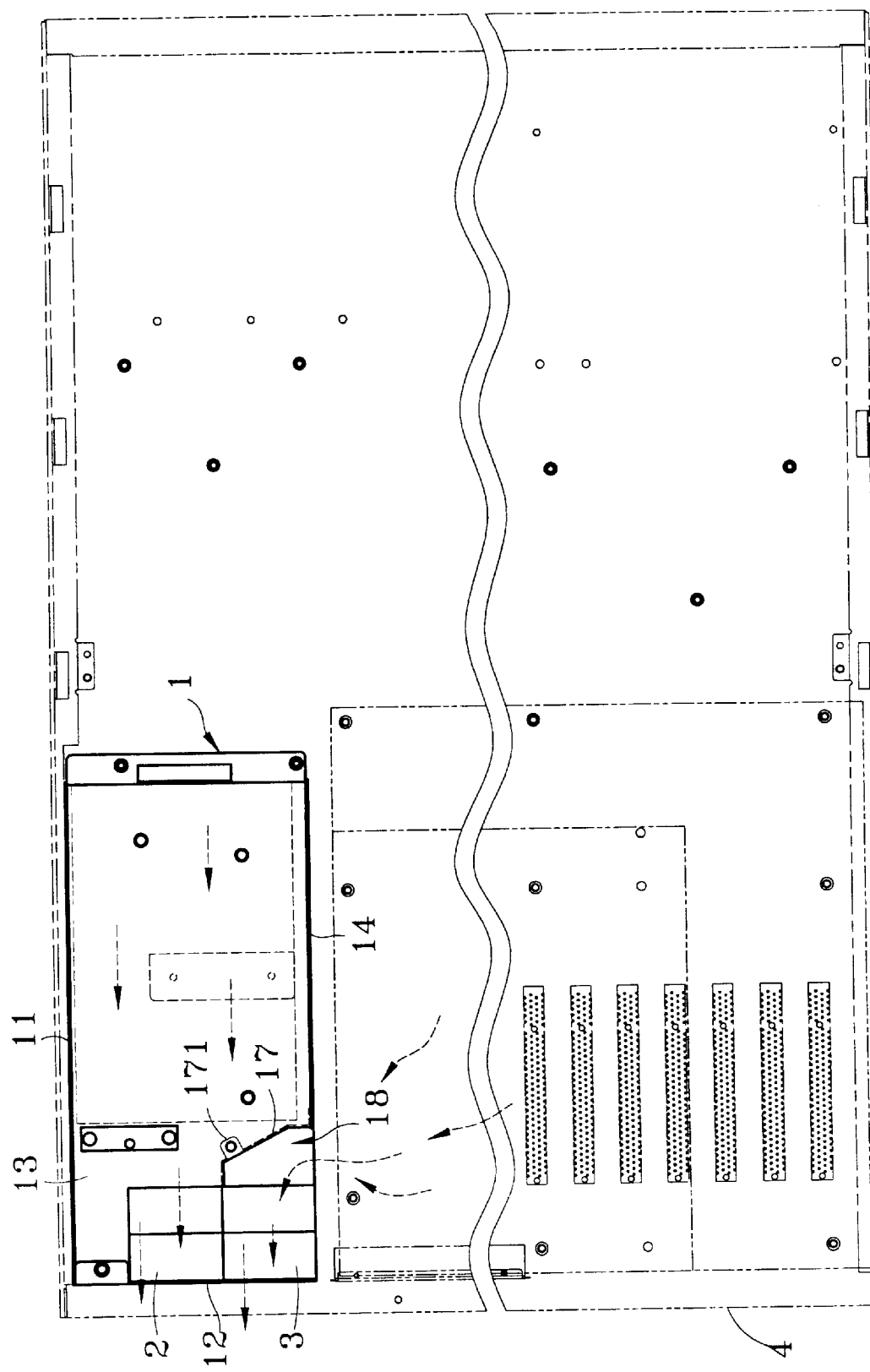
FIG. 3 is a schematic view showing the convection of fluid in the present invention.

Referring to FIG. 3, a schematic view for the convection of air is illustrated. As shown in the figure, the second fan set 3 is assembled to one end of the air channel 18 positioned on the panel 12 of the housing 11. When the computer chassis 4 is opened, it can be seen that the first and second fan sets 2 and 3 will operate at the same time. It can be appreciated from the figures that with the air flowing direction and spacing of the spacer 17, the first fan set 2 will extract heat from the components of the power supply and then transfer the heat outwards from the air hole 121 so that the temperature within the power supply is reduced and thus the power supply is operated normally. While, as the second fan set operates, the heat in the computer chassis 4 will be extracted through the air channel 18 and transfers the heat outwards from the air hole 121' so that heat from the inner components within the computer chassis 4 is dissipated effectively. Thus, heat from the inner components of the computer chassis 4 can be dissipated and thus temperature is reduced so as to retain the working efficiency of the computer chassis.

Figure 4:
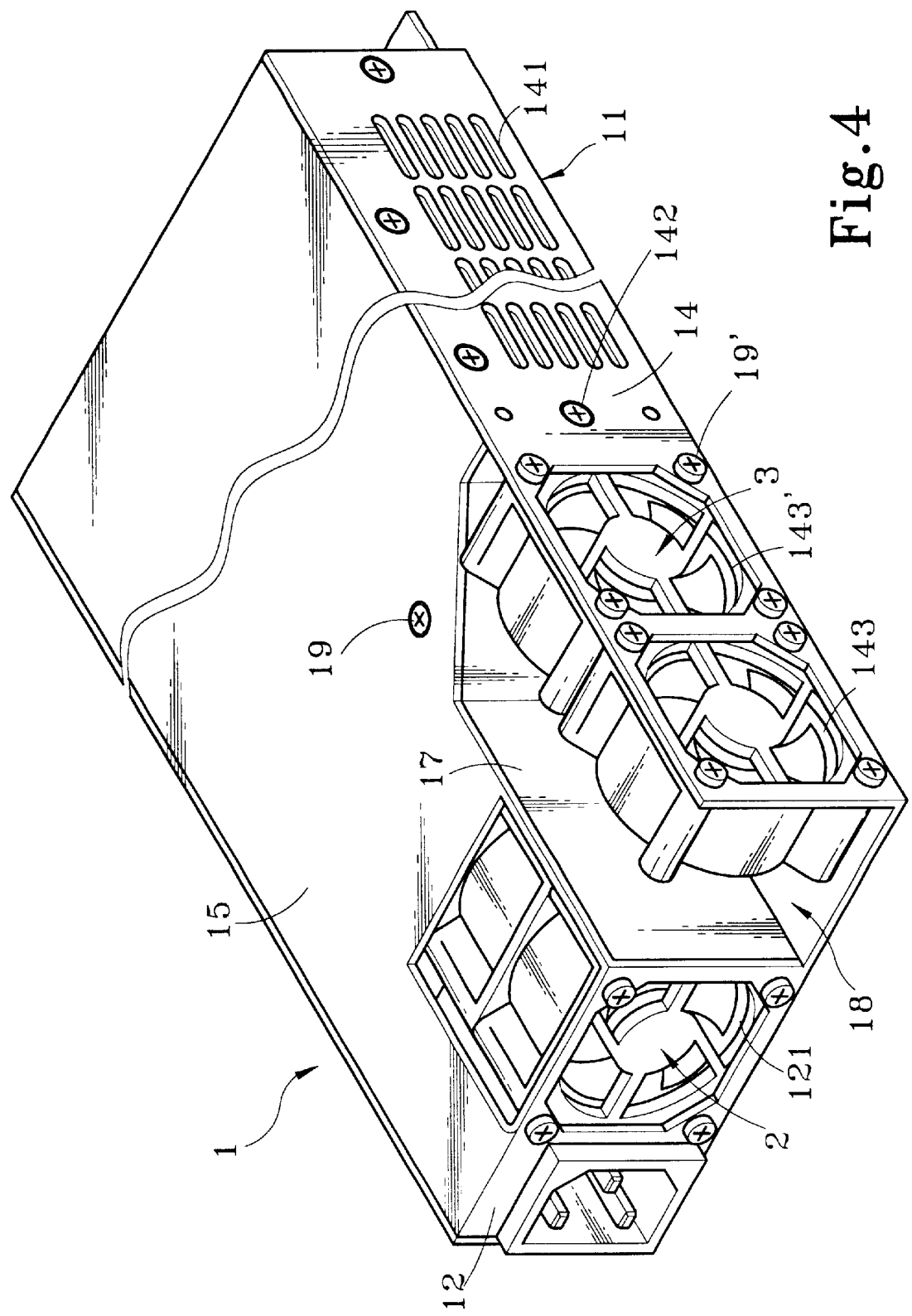
FIG. 4 is a schematic view showing an arrangement of the second fan set in the present invention.

With reference to FIG. 4, another arrangement for the second fan set 3 in the present invention is illustrated. The second fan set 3 is arranged at one end of the air channel 18 and is in communication with the computer chassis 4 and is fixed to the lateral plate 14 of the housing 11 by the positioning piece 19. When the second fan set 3 operates, hot air flow is exhausted from the computer chassis 4 through the air hole 143 and 143' and the air channel 18.

Figure 5:
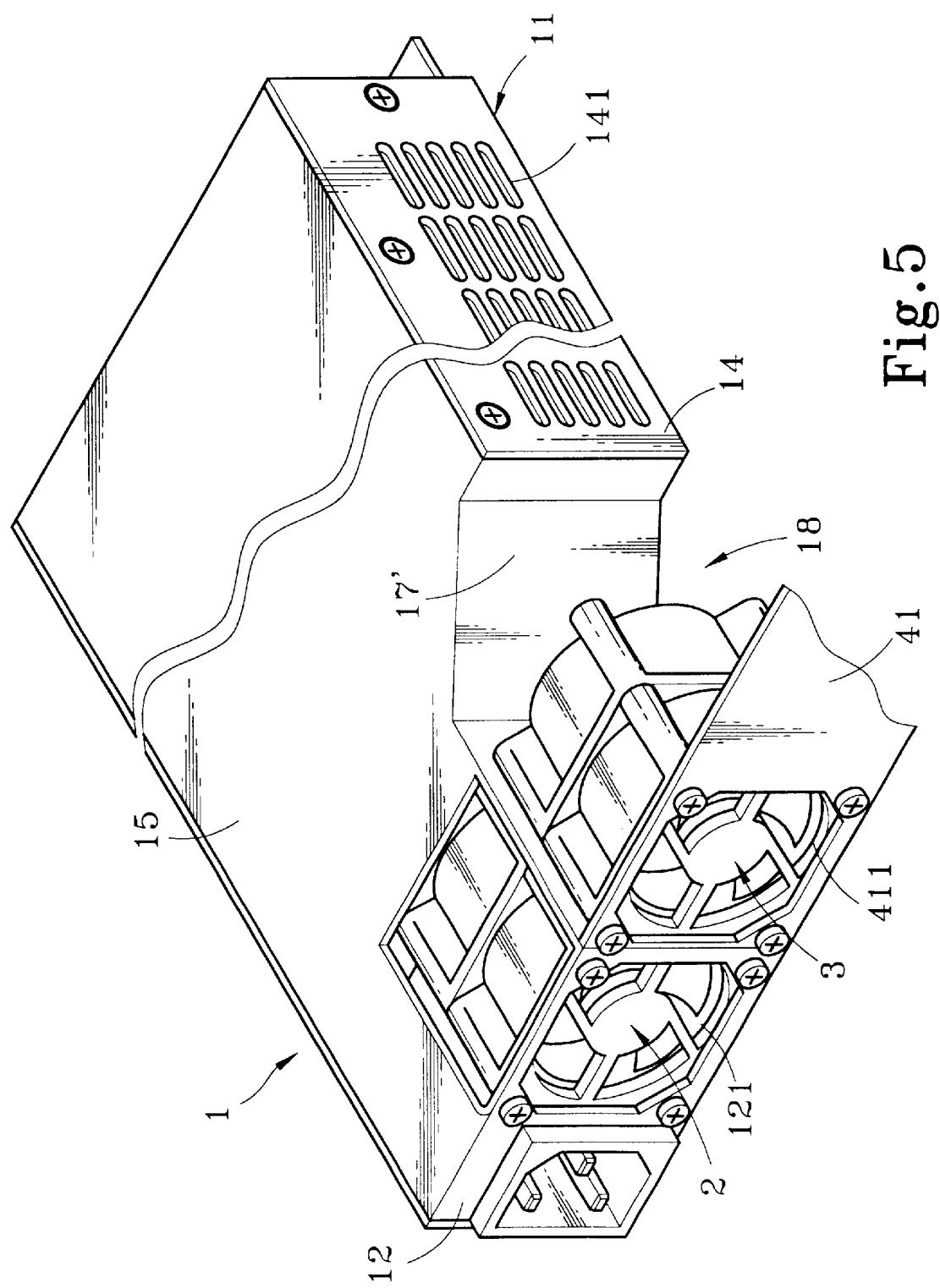
FIG. 5 is a schematic view of another embodiment in the present invention.

Referring to FIG. 5, the schematic view for the embodiment of the present invention is shown herein. As shown in the figure, the spacer 17' is integrally formed with the housing 11, and the housing 11 has a recess. Then, the second fan set 3 is directly positioned in the air hole 411 on the frame 41 of the computer chassis 4 within the recess of the housing 11 so that the recess in the housing 11 will be formed as an air channel 18 for achieving the aforesaid heat dissipating operation.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A heat dissipating power supply for a computer chassis, the power supply comprising:

internal components;

a housing;

a spacer secured on an open end of the housing and adapted to form a first air channel to a computer chassis, the spacer also forms a second air channel between the first fan set and the internal components of the power supply;

a first fan set comprising one or more fans, the first fan set secured to the housing and adapted to dissipate heat generated from the internal components of the power supply; and a second fan set comprising one or more fans secured to the housing at the second air channel such that heat generated in a computer chassis to which the power supply is attachable is dissipated via the second fan set.

2. The heat dissipating power supply as claimed in claim 1, further comprising a panel forming an outer wall of the housing, and one or more air holes provided on the panel, the one or more air holes in communication with the first and second fan sets such that heat is dissipated out of the air holes, guide holes on the housing, the spacer, the first and second fan sets and the panel is adapted to permit proper positioning of the spacer, the first and second fan sets.

3. The heat dissipating power supply as claimed in claim 1, wherein a periphery of the spacer is bent to form a positioning portion, such that the spacer provides the air channels, and is aligned with alignment holes for the housing and the spacer.

4. The heat dissipating power supply as claimed in claim 1, wherein the spacer is integrally formed with the housing and the housing is formed with a recess, and the second fan set is directly positioned in the computer chassis with respect to the recess of the housing.

5. The heat dissipating power supply as claimed in claim 1, further comprising a lateral plate forming an outer wall of the housing, and one or more air holes provided on the lateral plate, the one or more air holes in communication with the first and second fan sets such that heat is dissipated out of the air holes, guide holes on the housing, the spacer, the first and second fan sets, and the lateral plate is adapted to permit proper positioning of the spacer, the first and second fan sets and the lateral plate.

* * * * *